US008953555B2

(12) United States Patent
Lee

(10) Patent No.: US 8,953,555 B2
(45) Date of Patent: Feb. 10, 2015

(54) CELL RESELECTION METHOD AND APPARATUS FOR PACKET DATA SERVICE IN A MOBILE COMMUNICATION TERMINAL

(75) Inventor: Beom-Yong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 896 days.

(21) Appl. No.: 12/882,566

(22) Filed: Sep. 15, 2010

(65) Prior Publication Data

US 2011/0064052 A1 Mar. 17, 2011

(30) Foreign Application Priority Data

Sep. 17, 2009 (KR) .................. 10-2009-0087982

(51) Int. Cl.
*H04W 4/00* (2009.01)
*H04W 36/00* (2009.01)

(52) U.S. Cl.
CPC .............................. *H04W 36/0022* (2013.01)
USPC ........................................................ 370/331

(58) Field of Classification Search
USPC ......... 370/217–218, 328–337, 342–343, 441, 370/442; 455/422.1, 435.2, 435.3, 445; 709/249
See application file for complete search history.

(56) References Cited

U.S. PATENT DOCUMENTS

| 8,249,591 | B2 * | 8/2012 | Tod et al. | 370/328 |
|---|---|---|---|---|
| 8,279,834 | B2 * | 10/2012 | Mildh | 370/331 |
| 8,385,278 | B2 * | 2/2013 | Kubo | 370/329 |
| 2010/0172301 | A1 * | 7/2010 | Watfa et al. | 370/328 |
| 2010/0195568 | A1 * | 8/2010 | Iimori | 370/328 |
| 2010/0202413 | A1 * | 8/2010 | Vikberg et al. | 370/332 |
| 2010/0234026 | A1 * | 9/2010 | Tenny et al. | 370/331 |
| 2010/0279677 | A1 * | 11/2010 | Dwyer et al. | 455/422.1 |
| 2010/0284333 | A1 * | 11/2010 | Shirota et al. | 370/328 |
| 2010/0316000 | A1 * | 12/2010 | Burbidge et al. | 370/328 |
| 2011/0080894 | A1 * | 4/2011 | Iwamura et al. | 370/331 |
| 2011/0090790 | A1 * | 4/2011 | Bergqvist et al. | 370/230 |
| 2011/0188470 | A1 * | 8/2011 | Lu et al. | 370/331 |
| 2011/0275373 | A1 * | 11/2011 | Lee | 455/435.2 |
| 2013/0107811 | A1 * | 5/2013 | Watfa et al. | 370/328 |

* cited by examiner

*Primary Examiner* — Jeffrey M Rutkowski
(74) *Attorney, Agent, or Firm* — Jefferson IP Law, LLP

(57) ABSTRACT

A cell reselection method and apparatus for a packet data service in a mobile communication terminal are provided. The cell reselection method for the packet data service in the mobile communication terminal includes if a Circuit Switch (CS) call ends, determining whether the ended call is a CS fallback call, if it is determined that the ended call is the CS fallback call, determining whether an accessible Evolved Universal Mobile Telecommunications System (UMTS) Terrestrial Radio Access Network (E-UTRAN) cell exists by measuring signals received from neighbor cells, and reselecting the accessible E-UTRAN cell.

8 Claims, 2 Drawing Sheets

CELL RESELECTION METHOD AND APPARATUS FOR PACKET DATA SERVICE IN A MOBILE COMMUNICATION TERMINAL

PRIORITY

This application claims the benefit under 35 U.S.C. §119 (a) of a Korean patent application filed in the Korean Intellectual Property Office on Sep. 17, 2009, and assigned Serial No. 10-2009-0087982, the entire disclosure of which is hereby incorporated by reference.

BACKGROUND OF THE INVENTION

1. Field of the Invention

The present invention relates to a cell reselection method and apparatus for a packet data service in a mobile communication terminal. More particularly, the present invention relates to a method and an apparatus for reselecting a cell between an Evolved Universal Mobile Telecommunications System (UMTS) Terrestrial Radio Access Network (E-UTRAN) system and a non E-UTRAN system.

2. Description of the Related Art

Currently, three schemes including Global System for Mobile communication (GSM) system which is a second-generation system, and synchronous Code Division Multiple Access 2000 (CDMA2000) system and Universal Mobile Telecommunication Services (UMTS) system which are the third-generation systems are being used. The UMTS leads the standardization in the $3^{rd}$-Generation Partnership Project (3GPP). The UMTS system features efficient high-rate data/multimedia service up to 2 Mbps, which is a high data rate than the existing second-generation system. Standardization of Long Term Evolution (LTE) which is a fourth-generation system is currently being developed. The purpose of the LTE is to establish an Evolved UMTS Terrestrial Radio Access Network (E-UTRAN).

A UMTS Terrestrial Radio Access Network (UTRAN) system and a GSM Enhanced Data Rates for Global Evolution (EDGE) Radio Access Network (GERAN) system presently support both a Circuit Switch (CS) scheme and a Packet Switch (PS) scheme, whereas the E-UTRAN system supports only the PS scheme. While the LTE supports a voice call based on Internet Protocol (IP) Multimedia Subsystem (IMS), most providers do not adopt the IMS and only few providers intend to adopt the IMS. Thus, the LTE standard suggests a CS fallback service to support the voice call.

When a mobile communication terminal supporting the LTE is camping in a cell of the E-UTRAN and a Mobile Originate (MO) call or a Mobile Terminate (MT) call takes place, the CS fallback service hands the mobile communication terminal to a non E-UTRAN and then processes the voice call.

Meanwhile, a current E-UTRAN system employs a priority based cell reselection scheme. A Release 7 version of the UMTS system of uses a best cell based cell reselection scheme. Accordingly, in an area covering both of the E-UTRAN system using the priority based reselection and the system using the best cell based cell reselection, the mobile communication terminal supporting the LTE may not normally use the packet service.

For example, when the mobile communication terminal supporting the LTE is using the packet service over the E-UTRAN and the MT call takes place, both of the CS call and the packet services are handed over to the non E-UTRAN to provide continuous service to a user. However, when the packet service cannot be handed over to the non E-UTRAN because of characteristics such as transfer rate or bandwidth, the E-UTRAN suspends the packet service and transmits a paging message indicating a Core Network (CN) domain field value with the CS to the mobile communication terminal. The mobile communication terminal receiving the paging message recognizes the CS call issued to itself, hands over to the cell of the UTRAN or the GERAN through the CS fallback procedure, and thus receives only the CS call service. Herein, when the CS call ends, the mobile communication terminal reselects the cell of the E-UTRAN to receive the suspended packet service. However, since the UTRAN or the GERAN is using the best cell based cell reselection scheme, when a cell signal of the UTRAN or the GERAN is good, the mobile communication terminal does not attempt the signal measurement for the cell reselection. As a result, the mobile communication terminal cannot receive the suspended packet service.

Therefore, a need exists for a cell reselection method and apparatus for receiving a packet served of the cell reselection.

SUMMARY OF THE INVENTION

An aspect of the present invention is to address at least the above-mentioned problems and/or disadvantages and to provide at least the advantages described below. Accordingly, an aspect of the present invention is to provide a cell reselection method and apparatus for a packet data service in a mobile communication terminal.

Another aspect of the present invention is to provide a method and an apparatus for reselecting a cell from a non Evolved Universal Mobile Telecommunications System (UMTS) Terrestrial Radio Access Network (E-UTRAN) system to an E-UTRAN system in a mobile communication terminal supporting LTE.

Yet another aspect of the present invention is to provide a method and an apparatus for reselecting a cell to an E-UTRAN when a Circuit Switch (CS) fallback call over a non E-UTRAN ends in a mobile communication terminal supporting LTE.

In accordance with an aspect of the present invention, a cell reselection method for a packet data service in a mobile communication terminal is provided. The method includes if a CS call ends, determining whether the ended call is a CS fallback call, if it is determined that the ended call is the CS fallback call, determining whether an accessible E-UTRAN cell exists by measuring signals received from neighbor cells, and reselecting the accessible E-UTRAN cell.

In accordance with another aspect of the present invention, a cell reselection apparatus for a packet data service in a mobile communication terminal is provided. The apparatus includes a controller for, when a CS call ends, determining whether the ended call is a CS fallback call, and if it is determined that the ended call is the CS fallback call, determining whether an accessible E-UTRAN cell exists using signal measurements from neighbor cells, and a communication module for measuring the signals received from the neighbor cells under control of the controller, and reselecting the accessible E-UTRAN cell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a cell reselection method and apparatus for a packet data service in a mobile communication terminal. Hereinafter, the mobile communication terminal represents a mobile communication terminal supporting a Long Term Evolution (LTE) system. A Universal Mobile Telecommunications System (UMTS) Terrestrial Radio Access Network (UTRAN) and a Global System for Mobile communication (GSM) Enhanced Data Rates for Global Evolution (EDGE) Radio Access Network (GERAN) system are exemplified as non Evolved UMTS Radio Access Network (E-UTRAN) systems. Note that the present invention is applicable to other wireless systems supporting a Circuit Switch (CS) service.

Figure 1:
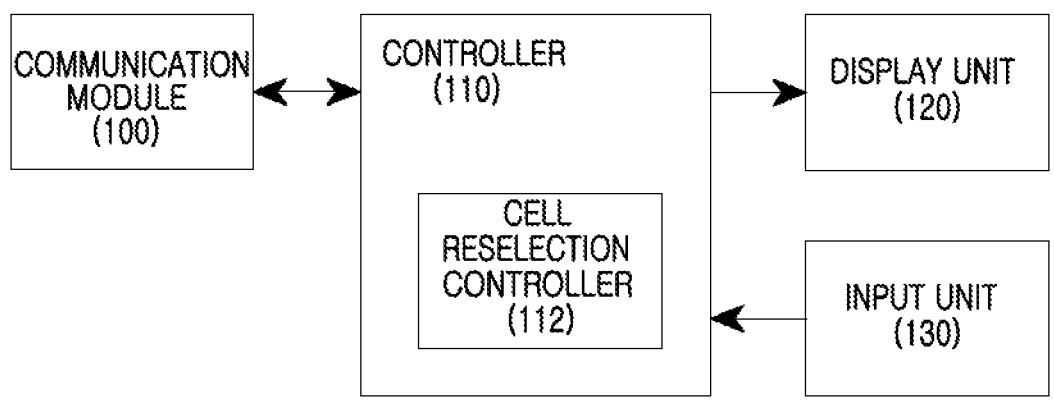
FIG. 1 illustrates a mobile communication terminal according to an exemplary embodiment of the present invention.

FIG. 1 is a block diagram of a mobile communication terminal according to an exemplary embodiment of the present invention.

Referring to FIG. 1, the mobile communication terminal includes a communication module 100, a controller 110, a display unit 120, and an input unit 130. The controller 110 includes a cell reselection controller 112.

The communication module 100 processes to transmit and receive radio signals of input/output data over an antenna (not illustrated). In more detail, the communication module 100 transmits and receives signals to and from cells of the E-UTRAN and the UTRAN/GERAN under the control of the controller 110, and transmits and receives signals for handover from the cell of the E-UTRAN to the cell of the UTRAN/GERAN and from the cell of the UTRAN/GERAN to the cell of the E-UTRAN. The communication module 100 measures a signal received at the mobile communication terminal, and provides the measured signal to the controller 110 under the control of the controller 110.

The controller 110 controls and processes operations of the mobile communication terminal. More specifically, the controller 110 controls and processes to receive packet service over the cell of the E-UTRAN. Upon receiving a paging message including a Core Network (CN) domain field value as the CS from the E-UTRAN while receiving the packet service, the controller 110 recognizes a CS call issued for the mobile communication terminal, hands over to the cell of the neighbor UTRAN or GERAN through a CS fallback procedure, and then controls and processes to receive the CS call service from the new cell.

When the CS call ends, the controller 110 determines whether the ended CS call is a CS fallback call. If it is determined that the CS call is the CS fallback call, the controller 110 determines whether an accessible E-UTRAN cell exists in the vicinity by measuring the signal intensity of the E-UTRAN cell through the communication module 100 regardless of the signal intensity of the current camping cell. If it is determined that the accessible E-UTRAN cell exists near the terminal, the controller 110 controls and processes to hand over to the E-UTRAN cell, that is, to reselect the cell. In doing so, when the suspended packet service is present in the E-UTRAN, the controller 110 controls and processes to receive the packet service from the E-UTRAN cell of the cell reselection. Meanwhile, when the ended CS call is not the CS fallback call or there is no accessible E-UTRAN, the controller 110 stays in the camping cell and enters an idle mode.

The display unit 120 displays status information, numbers, characters, still images, and videos generating in the operation of the mobile communication terminal. The input unit 130 includes function keys and number and character keys. The input unit 130 provides the controller 110 with input data corresponding to a key pressed by the user or a user's touch.

Figure 2:
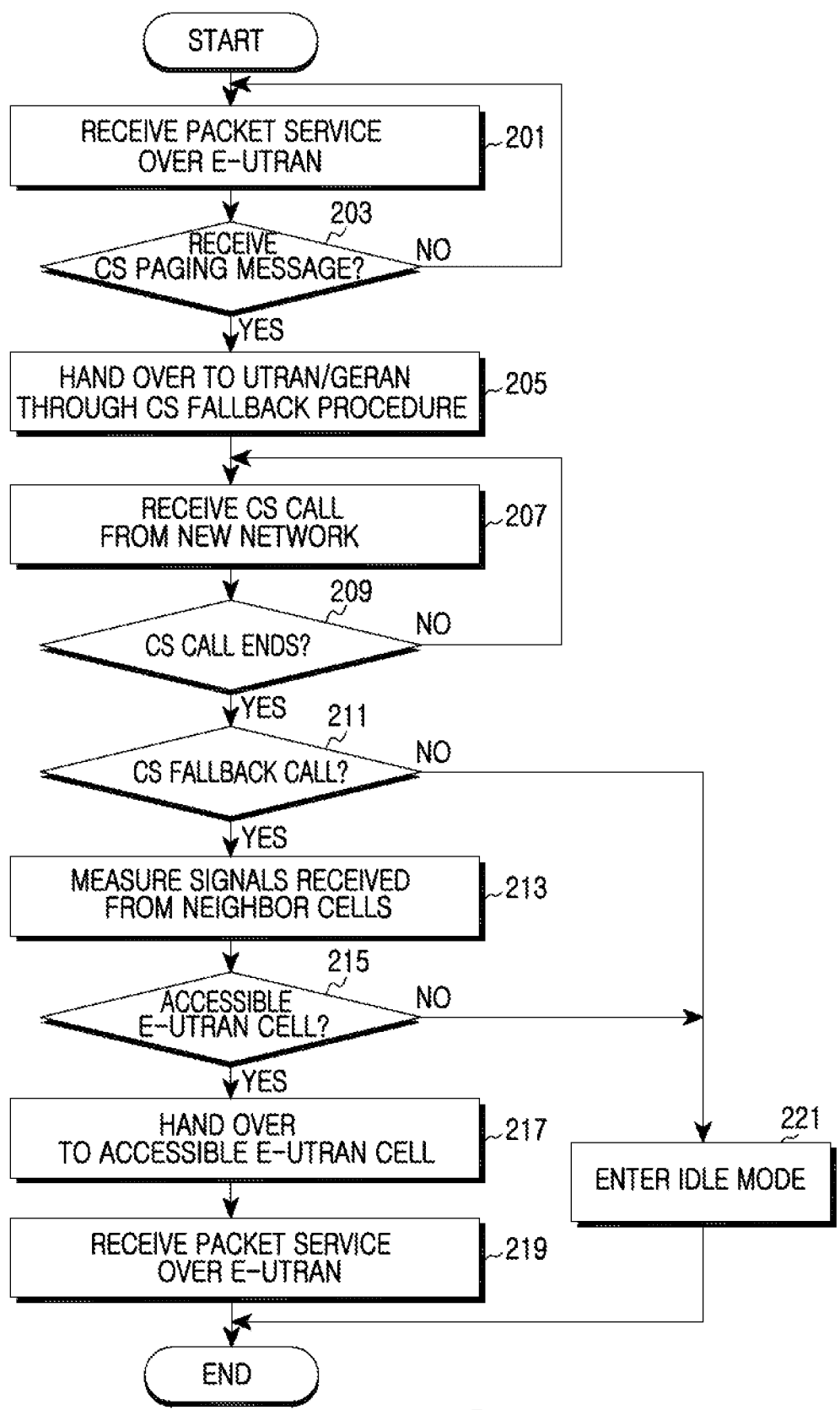
FIG. 2 illustrates a cell reselection method for a packet data service in a mobile communication terminal according to an exemplary embodiment of the present invention.

FIG. 2 illustrates a cell reselection method for the packet data service in a mobile communication terminal according to an exemplary embodiment of the present invention.

Referring to FIG. 2, the mobile communication terminal receives a packet service over an E-UTRAN in step 201 and determines whether a CS paging message is received in step 203. That is, the mobile communication terminal determines whether the paging message including a CN domain field value as the CS is received from the E-UTRAN. If it is determined that the CS paging message is not received, the mobile communication terminal returns to step 201 to receive the packet service over the E-UTRAN. Upon receiving the CS paging message, the mobile communication terminal recognizes the CS call issued to itself and hands over to a neighbor cell of a UTRAN or a GERAN through the CS fallback procedure in step 205. Herein, as the mobile communication terminal hands over to the cell of the UTRAN or the GERAN for the sake of the CS call, the packet service from the E-UTRAN is suspended. The CS fallback procedure may be carried out in a conventional manner.

The mobile communication terminal receives the CS call service from the cell of the UTRAN or the GERAN in step 207, and determines whether the CS call ends in step 209. If it is determined that the CS call does not end, the mobile communication terminal returns to step 207 to receive the CS call service from the cell of the UTRAN or the GERAN.

If it is determined that the CS call ends, the mobile communication terminal examines whether the ended CS call is a CS fallback call in step 211. Herein, whether the ended CS call is the CS fallback call may be determined by analyzing the type or character of the CS call. For example, determining whether the CS call is the CS fallback call may be based on the CN domain field of the paging message for the CS call. If it is determined that the CS call is not the CS fallback call, the mobile communication terminal stays in the current camping cell and enters the idle mode in step 221, and then finishes the process.

In contrast, if it is determined that the CS call is the CS fallback call, the mobile communication terminal measures the intensity of signals received from the neighbor cells in step 213, and determines whether the accessible E-UTRAN cell exists in the vicinity in step 215. Herein, the mobile communication terminal may measure the signals received from the neighbor cells regardless of the signal intensity of the current camping UTRAN or GERAN, and measure the intensity of a reference signal of the E-UTRAN cell before the CF fallback. Herein, the existence of the accessible E-UTRAN cell may be determined by verifying a signal greater than a threshold among the signals of the E-UTRAN received at the mobile communication terminal.

If it is determined that the accessible E-UTRAN cell is not in the vicinity, the mobile communication terminal stays in the current camping cell and enters the idle mode in step 221, and then finishes this process.

In contrast, if it is determined that the accessible E-UTRAN cell is in the vicinity, the mobile communication terminal hands over to the accessible E-UTRAN cell, that is, reselects the cell in step 217. Herein, if there is a plurality of the accessible E-UTRAN cells, the mobile communication terminal may select and hand over to the cell with the greatest signal intensity. Even when the accessible E-UTRAN does not meet normal inter-Radio Access Technology (RAT) cell reselection conditions, the mobile communication terminal may reselect the accessible E-UTRAN cell.

The mobile communication terminal receives the suspended packet service over the new E-UTRAN cell again in step 219, and finishes this process.

If the CS call takes place in the packet service over the E-UTRAN, the mobile communication terminal suspends the packet service and hands over to the non E-UTRAN, and the CS call ends, the mobile communication terminal reselects the cell back to the E-UTRAN for the sake of the packet service. Yet, although the mobile communication terminal does not receive the packet service over the E-UTRAN, when the call ends, the mobile communication terminal may reselect the E-UTRAN cell by determining the call type. That is, when the call ends in the mobile communication terminal regardless of a previous situation of the mobile communication terminal, the mobile communication terminal determines the ended call type. When the call type indicates the CS fallback call, the mobile communication terminal may reselect the accessible E-UTRAN cell in the vicinity.

When the CS fallback call over the non E-UTRAN ends, the mobile communication terminal supporting the LTE reselects the E-UTRAN cell regardless of the signal intensity of the non E-UTRAN and the E-UTRAN neighbor cell information in a $2^{nd}$ Generation/$3^{rd}$ Generation (2G/3G) network. Therefore, it is possible to address no packet service due to the signal intensity of the non E-UTRAN.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A cell reselection method for a packet data service in a mobile communication terminal, the method comprising:
   receiving packet service over an accessible Evolved Universal Mobile Telecommunications System (UMTS) Terrestrial Radio Access Network (E-UTRAN) cell;
   recognizing a Circuit Switch (CS) call issued for the mobile communication terminal upon receiving a CS paging message while receiving the packet service; and
   handing over the CS call to a neighboring UTRAN/Global Evolution (EDGE) Radio Access Network (GERAN) cell through a CS fallback procedure,
   wherein when the CS call ends, determining whether the ended call is a CS fallback call; and
   wherein in response to determining that the ended call is the CS fallback call, determining whether an accessible E-UTRAN cell exists by measuring signals received from neighbor cells; and
   reselecting the accessible E-UTRAN cell,
   wherein in response to determining that the ended call is not the CS fallback call, camping on the neighboring UTRAN/GERAN cell and entering an idle mode.

2. The method of claim 1, wherein the ended call is determined as the CS fallback call by analyzing a Core Network (CN) domain field of a paging message for a corresponding call.

3. The method of claim 1, further comprising:
   in response to determining that the accessible E-UTRAN cell does not exist, staying in a current camping cell.

4. The method of claim 3, further comprising:
   in response to determining that the accessible E-UTRAN cell exists, reselecting the cell.

5. A cell reselection apparatus for a packet data service in a mobile communication terminal, the apparatus comprising:
   a controller configured to receive packet service over an accessible Evolved Universal Mobile Telecommunications System (UMTS) Terrestrial Radio Access Network (E-UTRAN) cell, to recognize a Circuit Switch (CS) call issued for the mobile communication terminal upon receiving a CS paging message while receiving the packet service, to hand over the CS call to a neighboring UTRAN/Global Evolution (EDGE) Radio Access Network (GERAN) cell through a CS fallback procedure, to determine whether the ended call is a CS fallback call when the CS call ends, to determine whether an accessible E-UTRAN cell exists using signal measurements from neighbor cells in response to determining that the ended call is the CS fallback call, and to camp on the neighboring UTRAN/GERAN cell and enter and idle mode in response to determining that the ended call is not the CS fallback call; and
   a transceiver configured to measure the signals received from the neighbor cells under control of the controller, and to reselect the accessible E-UTRAN cell.

6. The apparatus of claim 5, wherein the controller determines whether the ended call is the CS fallback call by analyzing a Core Network (CN) domain field of a paging message for the ended call.

7. The apparatus of claim 5, wherein, in response to determining that the accessible E-UTRAN cell does not exist, the controller stays in a current camping cell.

8. The apparatus of claim 7, wherein, in response to determining that the accessible E-UTRAN cell exists, the controller reselects the cell.

* * * * *